United States Patent [19]

Matsudaira et al.

[11] Patent Number: 4,945,432

[45] Date of Patent: Jul. 31, 1990

[54] MAGNETIC DISK DRIVE WITH BRITTLE DISKS

[75] Inventors: Takeo Matsudaira, Cupertino; Hiroshi Kouno, Sunnyvale, both of Calif.; Shinji Eda, Yamanashi; Juuzoh Funayama, Kanagawa, both of Japan

[73] Assignee: Hoya Electronics Corporation, San Jose, Calif.

[21] Appl. No.: 175,510

[22] Filed: Mar. 31, 1988

[51] Int. Cl.$^5$ .............................................. G11B 5/012
[52] U.S. Cl. ................................ 360/98.02; 360/98.08
[58] Field of Search ............. 360/98.01, 98.02, 98.07, 360/98.08, 99.01, 99.05, 99.12, 135, 86

[56] References Cited

U.S. PATENT DOCUMENTS

| | | | |
|---|---|---|---|
| 3,931,645 | 1/1976 | Dodd et al. | 360/98.02 |
| 4,152,487 | 5/1979 | Yamagisawa | 360/135 |
| 4,738,885 | 4/1988 | Matsumoto | 360/135 |
| 4,775,906 | 10/1988 | Suzuki et al. | 360/98.08 |
| 4,777,549 | 10/1988 | Dushkes et al. | 360/98.07 |

*Primary Examiner*—David J. Severin
*Attorney, Agent, or Firm*—Flehr, Hohbach, Test, Albritton & Herbert

[57] ABSTRACT

A magnetic disk drive of the Winchester type has magnetic disks layered around the external peripheral surface of a spindle and separated mutually from one another by spacers. The substrate of the magnetic disks are made of non-metallic materials such as glass or ceramics but do not break easily by the motion of the spindle or the change in temperature because either the adhesive used to form a unistructural assembly of the magnetic disks and the spacers or elastic members inserted in annular indentations formed in the spacers serve as a buffer when the magnetic disks and the spacers are compressed together.

30 Claims, 7 Drawing Sheets

MAGNETIC DISK DRIVE WITH BRITTLE DISKS

BACKGROUND OF THE INVENTION

This invention relates to a magnetic disk drive and more particularly to a magnetic disk drive capable of securely holding magnetic disks made of a brittle non-metalic material such as glass or ceramics such that they are not broken easily either during the operation of the disk drive or because of the difference in thermal expansion between its spindle and its spacers.

Figure 1:
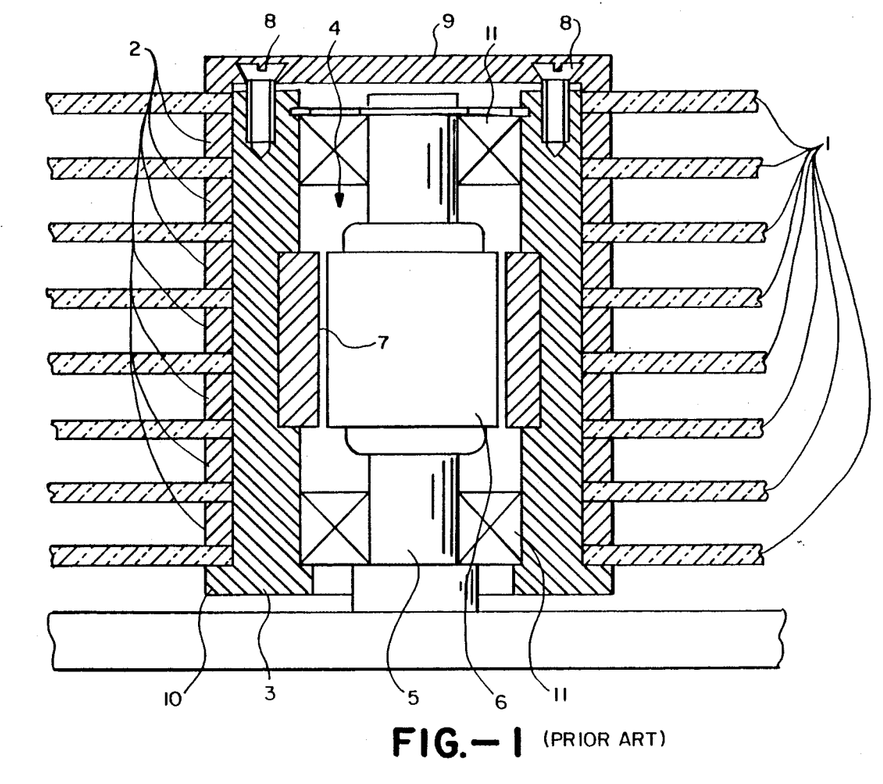
FIG. 1 is a sectional view of a conventional magnetic disk drive of the Winchester type showing its center part.

Many types of magnetic disk drives have been proposed and developed. The prior art magnetic disk drive of the so-called Winchester type, as an example, has a plurality of magnetic disks stacked one on top of another with spaces 2 inserted in between on the outer peripheral surface of a spindle hub (hereinafter referred to simply as "spindle") 3 as shown in FIG. 1. The spindle 3 contains a motor 4 inside with its shaft 5 held stationary so that its exterior rotates around this stationary shaft 5. A coil is wound around this stationary shaft 5 to form a stator 6 and a magnet 7 is disposed on the internal wall of the spindle 3 so that the spindle 3 can undergo a fast rotary motion (of about 3600 rpm, for example) as the motor 4 is activated. The magnetic disks 1 are usually of the type with a magnetic film covering a metallic base plate, for example, of aluminium or an aluminium alloy and the stacked disks 1 are pressed together against a bottom rim 10 of the spindle 3 by a metallic cap 9. The rim 10 is a protrusion unistructurally formed on the external peripheral surface of the spindle 3 at its lower end. The cap 9, which is hereinafter also referred to as a fastening means, is affixed to the top surface of the spindle 3 with set screws 8 so that the disks 1 are prevented not only from racing because of their own angular momentum but also from changing their relative positions within the disk drive. The spacers 2 are made of aluminium or an aluminium alloy, the spindle 3 is made of a kind of steel, and numeral 11 in FIG. 1 indicates bearings.

Recently, there have been increasing demands for an improved recording density. In response to such demands, magnetic disks with substrates made of brittle non-metallic materials such as glass and ceramics are currently being considered because these materials have certain superior qualities. Substrates made of such materials have fewer surface defects than those of aluminium or an aluminium alloy and a magnetic film can be formed without any very hard base layer of Ni-P, altimite or the like. Mere replacement of metallic substrates by glass or ceramic substrates, however, cannot respond to the aforementioned demands because magnetic disks made of such brittle materials tend to break easily. Metallic substrates are stronger and can withstand external forces applied thereon. Brittle materials such as glass and ceramics are weaker against external forces and tend to break easily for the following two major reasons. Firstly, the surfaces of the spacers 2, the metallic cap 9, and the rim 10 may not be finished well and localized forces may develop and be applied to the disks. Secondly, the spindle 3 of the type containing a motor inside is usually made of a soft steel with coefficient of thermal expansion about $90-120\times 10^{-7}$/deg and that of glass or ceramic base plates is about $40-120\times 10^{-7}$/deg while that of aluminum and aluminum alloys of which the spacers 3 and the cap 9 are made is much greater, being about $230-240\times 10^{-7}$/deg. When there is a large change in the ambient temperature, therefore, extraordinarily strong forces may be exerted on such brittle disks. These two reasons are, of course, not always clearly distinguishable. There may be occasions wherein the magnetic disks break as a combined result of these two reasons.

SUMMARY OF THE INVENTION

It is therefore an object of the present invention to eliminate the problems described above, or to provide a magnetic disk drive of the Winchester type with magnetic disks which are formed on substrates of a brittle non-metallic material such as glass or ceramics but are not easily breakable during an operation or because of a change in temperature.

A magnetic disk drive of the present invention with which the above and other objects are achieved comprises a spindle rotatable by the operation of a motor which is rotatably mounted onto a fixed shaft, a plurality of magnetic disks which are formed on substrates of a brittle non-metallic material such as glass or ceramics and are engagingly set around the external peripheral surface of this spindle and stacked in layers on a rim on the external peripheral surface of the spindle, and a plurality of spacers which are disposed between these magnetic disks to support them at fixed intervals. In one aspect of the present invention, the material for the spacers, metallic or non-metallic, is selected such that the difference in thermal expansion between the spindle and the spacers is reduced such that the disks will not be subjected to any undue stress. In another aspect of the present invention, the spacers and the magnetic disks are bonded together by an adhesive and form a unistructural assembly so that the adhesive serves as a buffer and prevents extraordinary external forces from being exerted on the magnetic disks. In still another aspect of the present invention, the spacers are formed with annular indentations or grooves and annular elastic members are inserted in these indentations. The compressive force which keeps the magnetic disks and the spacers in their respective positions deforms these elastic members and they are pressed not only against the spacers and the magnetic disks but also against the external peripheral surface of the spindle. This has the effect of preventing relative displacements of the magnetic disks both in the axial and rotational directions.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

In what follows, several 5.25-inch magnetic disk drives embodying the present invention are described and illustrated by drawings. Since these disk drives include many components which are substantially identical or at least similar to those of the prior art magnetic disk drive shown in FIG. 1, such components are indicated by the same numerals and are not explained repeatedly.

Figure 2:
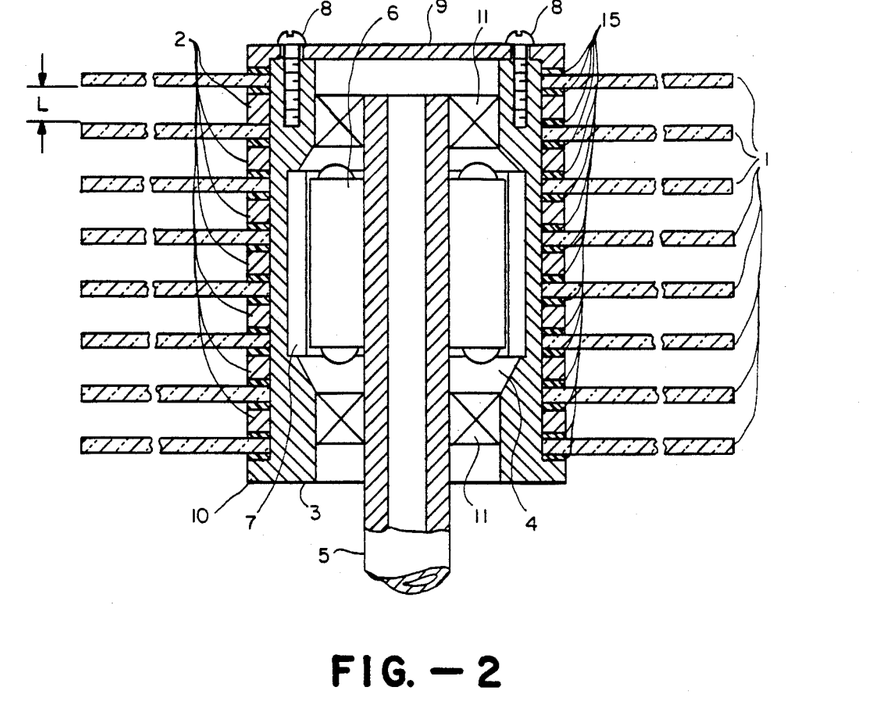
FIG. 2 is a sectional view of a center part of a magnetic disk drive of the Winchester type embodying the present invention.
Figure 3:
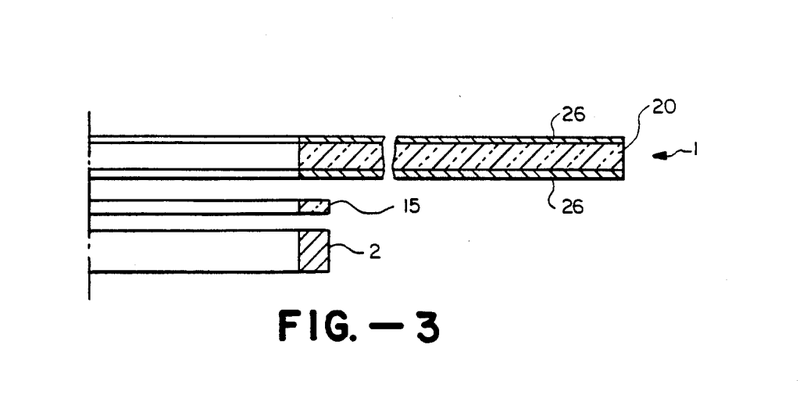
FIG. 3 is an enlarged view of a portion of FIG. 2.

The magnetic disk drive according to a first embodiment of the present invention shown in FIGS. 2 and 3 is different from the prior art device of FIG. 1 in that the substrates 20 of the magnetic disks 1 are made of a brittle non-metallic material such as glass or ceramics and that not only metallic annular spacers 2 of aluminum, an aluminum alloy or the like with 47 mm$\phi$ in external diameter, 40 mm$\phi$ in internal diameter and 5 mm in thickness but also elastic spacers 15 with 47 mm$\phi$ in external diameter, 40 mm$\phi$ in internal diameter and 0.1 mm in thickness are inserted between each pair of mutually adjacent disks 1 to keep them separated at a fixed distance.

The substrates 20 are made of soda-lime glass and formed in the shape of a disk with 130 mm$\phi$ in external diameter, 40 mm$\phi$ in internal diameter and 1.9 mm in thickness. Magnetic films 26 of a specified thickness are formed on their upper and lower surfaces by any known prior art technology. The magnetic films 26 are comprised, for example, of a magnetic layer of a Co-Ni film formed on the substrate 20 and a C film layer which protectively covers this magnetic layer of Co-Ni. A base layer of a $ZrO_2$ film, a Cr film or the like may be provided between the substrate 20 and the magnetic layer of Co-Ni.

The materials of which the elastic spacers 15 may be made include synthetic resins such as polyesters, polyimides, polyamides, polyethylene, polyvinylchlorides, epoxy, resin fluorides, polyurethane and the like, synthetic rubber materials such as urethane rubber, silicone rubber, acrylic rubber, ethylenepropylene rubber and the like, and their mixtures. Alternatively, a composite layered material from these substances may be used. It is preferable that the material shows no significant plastic deformations within the range of allowable storage temperature from −40° C. to 70° C. These elastic spacers 15 are disposed on both surfaces of the magnetic disks 1 and in intimate contact therewith sandwiching the metallic spacers 2 therebetween. In order to prevent the direct contacts of the top and bottom disks respectively with the cap 9 for fastening them and the rim 10 of the spindle 3, elastic spacers 15 are disposd also between the top one of the magnetic disks 1 and the cap 9 and between the top surface of the rim 10 and the bottom one of the magnetic disks 1.

The disk drive of FIG. 2 may be assembled by placing a first of the elastic spacers 15 engagingly around the outer peripheral surface of the spindle 3 and sliding it therealong to set it on the rim 10, then similarly placing a first of the magnetic disks 1 around the spindle 3 and sliding it to set it on top of the first elastic spacer, and repeating the same sequentially with a second of the elastic spacers 15, a first of the metallic spacers 2, a third of the elastic spacers 15, a second of the magnetic disks 1, and so on. Thereafter, the cap 9 serving as a fastening means is set at the top and fastened onto the top surface of the spindle 3 by means of set screws 8, thereby securely fastening the entire assembly of the magnetic disks 1 on the rim 10. With a magnetic disk drive thus structured, the elastic spacers 15 make intimate contacts with the surfaces of the magnetic disks 1, the metallic spacers 2, the cap 9 and the rim 10 when the magnetic disks 1 are fastened together between the cap 9 and the rim 10 such that the compressive force in uniformly distributed. Moreover, the magnetic disks 1 are protected against extraordinarily large forces caused by the difference in thermal expansion of different components. Thus, the disks 1 are not deformed and do not break.

Figure 4:
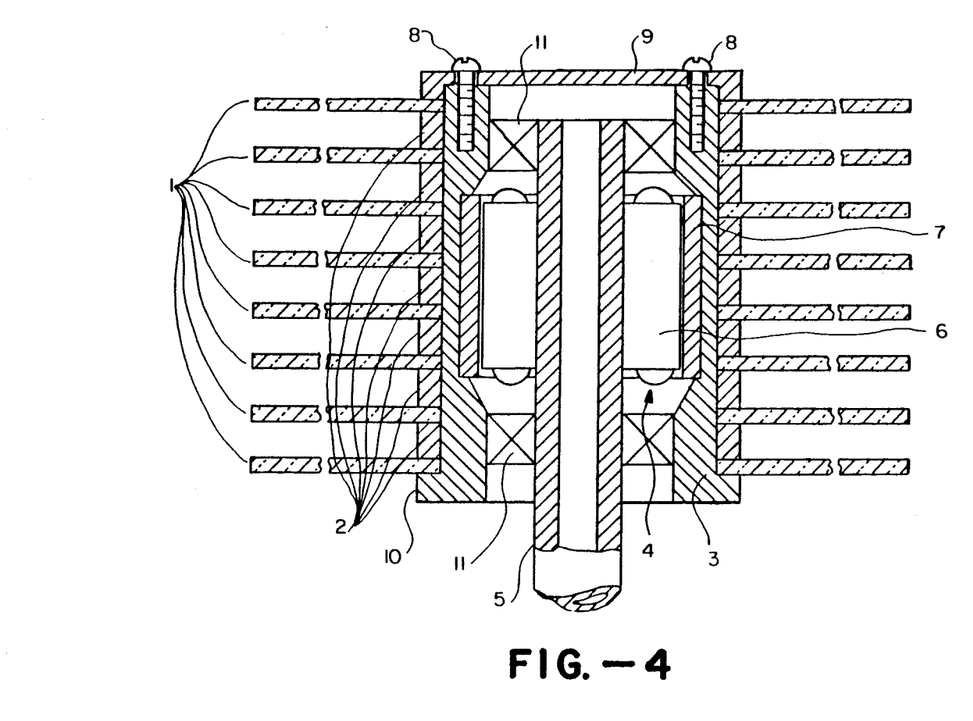
FIG. 4 is a sectional view of a center part of another magnetic disk drive embodying the present invention.

FIG. 4 shows another magnetic disk drive according to a second embodiment of the present invention which is structured similarly to the magnetic disk drive described above by way of FIGS. 2 and 3. It is characterized not by the use of elastic spacers but by the selection of material of which the metallic spacers 2 are made. With reference to FIG. 4, the magnetic disks 1 are made with base plates (not separately shown) of soda-lime glass as in the first embodiment explained above and hence their coefficient of thermal expansion is $94 \times 10^{-7}$/deg. The spindle 3 is made of a carbon steel and its coefficient of thermal expansion is about $105-110 \times 10^{-7}$/deg. The metallic spacers 2 according to this embodiment are made of S10C soft steel with coefficient of thermal expansion of $110 \times 10^{-7}$/deg.

In summary, no elastic spacers of the type shown in FIG. 2 are employed but, since the spindle 3 and the metallic spacers 2 have very similar coefficients of thermal expansion, they expand at nearly the same rate as temperature changes. Unlike prior art magnetic disk drives with metallic spacers made of aluminum or an aluminum alloy, the tensile forces exerting on the magnetic disks 1 can be made extremely small within the temperature range between −40° C. and 70° C.

Although the use of a soft steel was disclosed above with respect to FIG. 4, this is not intended to limit the scope of the present invention. In general, materials with coefficient of thermal expansion within $\pm 50 \times 10^{-7}$/deg of that of the spindle 3 are within the scope of the present invention. The difference is preferably within $\pm 30 \times 10^{-7}$/deg. More preferably, the spindle 3 is made of a magnetic material with coefficient of thermal expansion in the range of $90-120 \times 10^{-7}$/deg and the metallic spacers 2 have thermal expansion in the range of $90-130 \times 10^{-7}$/deg. Stainless steels ($110\times10^{-7}$/deg), high-carbon steels ($96-100\times10^{-7}$/deg), SAE1010 of U.S. Standard A1S1 ($110\times10^{-7}$/deg), hard steels ($107\times10^{-7}$/deg), titanium alloys such as Ti-6A1-4V ($88\times10^{-7}$/deg) and those of the above with anti-rust plating of Cr, Su, Ni, Zn, etc. are examples of materials which can be advantageously utilized with glass and ceramic substrates having coefficients of thermal expansion $40-120\times10^{-7}$/deg It goes without saying that elastic spacers may be additionally inserted between the magnetic disks 1 and the metallic spacers 2 made of such materials as well as between the magnetic disks 1 and the cap 9 and/or the rim 10 as explained above in connection with and shown in FIG. 2.

As a further variation to the embodiment of the present invention described above, the cap 9 as well as the metallic spacers 2 may preferably be made of 13-Cr stainless steel such as SUS420J2 with coefficient of thermal expansion $110\times10^{-7}$/deg and the set screws made of nickle-chromium hard steel with coefficient of thermal expansion $107\times10^{-7}$/deg such that the cap 9 can be prevented from bending as a result of the difference in thermal expansion and hence localized forces exerted thereby on the magnetic disks 1 can be reduced. In general, it is preferable that the cap 9 and set screws 8 be made of a material of which the coefficient of thermal expansion is within $\pm50\times10^{-7}$/deg of that of the magnetic disks 1. If the magnetic disks 1 of a non-metallic brittle material such as glass or ceramics with coefficient of thermal expansion in the range of $40-120\times10^{-7}$/deg, the steel materials mentioned above as preferable for the spacers 2 are also preferable materials for the cap 9. It is further preferable to design the cap 9 such that its peripheral section which presses the magnetic disks 1 is made thicker than 3 mm and/or to subject its material to a hardening process. The rigidity of the cap 9 can be thereby sufficiently improved and its deformation can be reduced.

Figure 5:
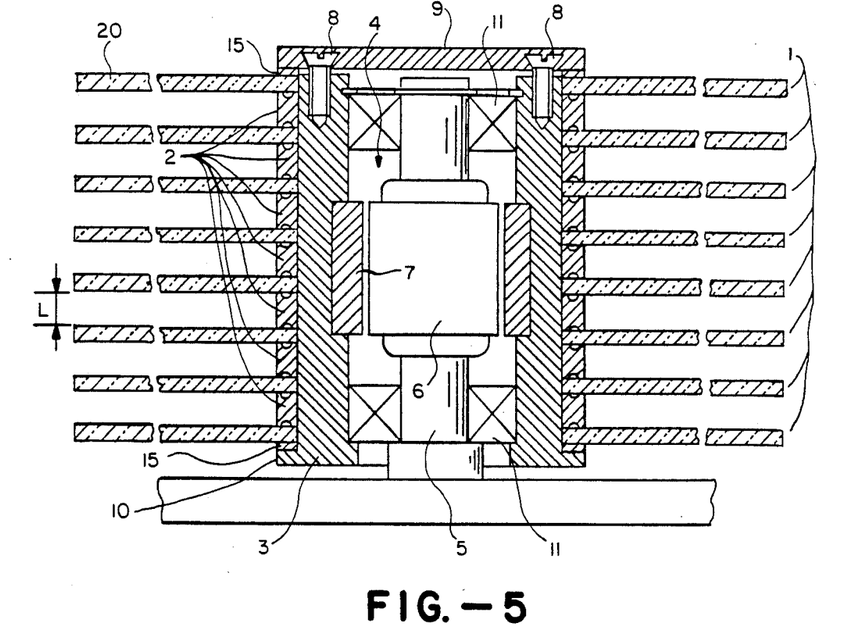
FIG. 5 is a sectional view of a center part of still another magnetic disk drive embodying the present invention.
Figure 6:
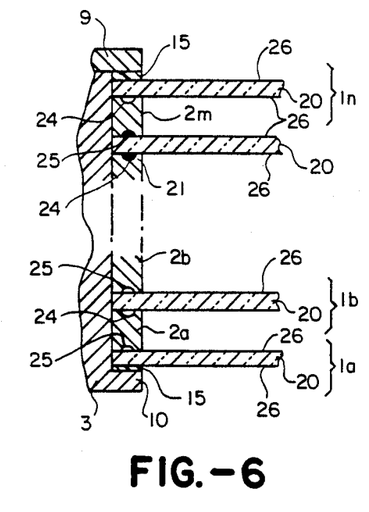
FIG. 6 is an enlarged view of a portion of FIG. 5.

FIGS. 5 and 6 show still another magnetic disk drive according to a third embodiment of the present invention which is characterized as having its magnetic disks 1 and metallic spacers 2 (of the same measurements and structured substantially the same as explained above) bonded together to form a unistructural assembly by means of an adhesive 21 and having elastic spacers 15 (also of the same measurements as above) sandwiched between the top magnetic disk of this assembly and the cap 9 and also between the bottom magnetic disk of this assembly and the top surface of the rim 10. The metallic spacers 2 according to this embodiment of the present inventon are further characterized as having annular grooves 24 and 25 formed on their upper and lower contact surfaces, respectively, so as to accept therein any excess amount of the adhesive 21. In other words, these grooves 24 and 25 serve to prevent the adhesive 21 from spilling out to contaminate the magnetic disks 1 when pressure is applied on the aforementioned assembly of the magnetic disks 1 and the metallic spacers 2 between the rim 10 and the cap 9.

A standard cylindrical jig (not shown) is used for unistructurally joining the magnetic disks 1 and the metallic spacers 2. The magnetic disks 1 and the metallic spacers 2 are thereby coaxially stacked together and the adhesive 21 is used with these spacers 2 compressed onto the surfaces of the magnetic disks 1. To explain more in detail, the first disk 1a is placed engagingly around the standard cylindrical jig and then the first metallic spacer 2a with both surfaces coated with an adhesive (such as an epoxy-type adhesive) is similarly inserted. Next, magnetic disks and spacers are sequentially stacked in the order of the second magnetic disk 1b, the second spacer 2b, the third magnetic disk 1c, the third spacer 2c, etc. After the final magnetic disk 1n is inserted, they are compressed and bonded firmly together. The unistructural assembly of the magnetic disks 1 and the metallic spacers 2 thus formed with the adhesive 21 is set around the spindle 3 as follows. First, the lower one of the elastic spacers 15 is engagingly inserted around the external peripheral surface of the spindle 3 and set on the rim 10. Next, the aforementioned assembly of the magnetic disks 1 and the metallic spacers 2 is engagingly placed around the external peripheral surface of the spindle 3 and set on the lower elastic spacer 15 just deposited. Next, the upper one of the elastic spacers 15 is similarly placed around the spindle 3 and after it is set on the magnetic disk 1n at the top, the cap 9 is fastened onto the top surface of the spindle 3 by means of the set screws 8, thereby securing the entire assembly of magnetic disks 1 on the rim 10.

With a magnetic disk drive thus structured, both the adhesive 21 which joins the magnetic disks 1 and the metallic spacers 2 unistructurally together and the elastic spacers 15 serve as buffers and absorb external forces, thereby preventing the magnetic disks 1 from breaking easily. Since the elastic spacers 15 are made of a synthetic resin or synthetic rubber material as explained above, they are elastic to a certain degree and the surfaces of the magnetic disks 1, the metallic spacers 2, the cap 9 and the rim 10 are uniformly compressed as the cap 9 is fastened so that the magnetic disks 1 are tightened by evenly distributed forces. Since the adhesive 21 also serves as a buffer, the magnetic disks 1 are prevented from becoming subjected to any tensile force due to the difference in coefficient of thermal expansion among various materials when there is a change in temperature. In other words, the magnetic disks 1 are protected by the elastic spacers 15 and the adhesive 21 and are not deformed, and hence do not break. Experiments show that no magnetic disk 1 broke by a heat cycle test in the range of $-40°$ C. to $70°$ C.

The positions of individual magnetic disks in the magnetic disk drive are determined relative to the magnetic heads of the device. Thus, the distance L between mutually adjacent ones of the magnetic disks 1 must be maintained relatively accurately. In the case of a magnetic disk drive of the Winchester type, a permissible error on the entire assembly of magnetic disks is about 0.2 mm. Errors in measurements do occur easily, however, if the number of magnetic disks 1 and hence the number of surfaces to be joined together by the adhesive 21 is increased. Thus, it is generally preferable that the adhesive 21 be applied as thinly as possible.

Figure 7:
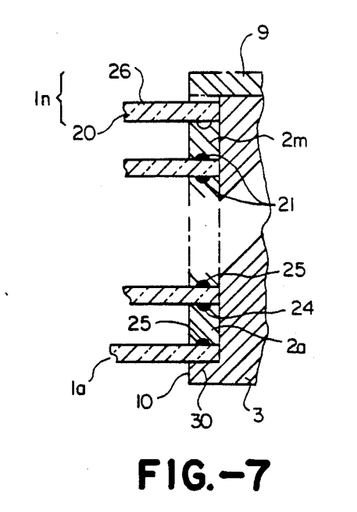
FIG. 7 is an enlarged view of a portion of another magnetic disk drive embodying the present invention.

FIG. 7 shows a variation of the embodiment of the present invention described above by way of FIGS. 5 and 6, characterized as having the lowest magnetic disk 1a placed directly on the rim 10, the topmost magnetic disk 1n pressed directly by the cap 9, and the assembly of the magnetic disks 1 and the metallic spacers 2 not only unistructurally bonded together with the adhesive 21 but also affixed to the external peripheral surface of the spindle 3 and to the rim 10 by the adhesive 21. In this example, too, the adhesive 21 serves as a buffer to absorb any external force and achieves the same effects explained above. The upper surface of the rim 10 is preferably also provided with an annular groove 30. Only a single groove of 0.5 mm in width is shown in FIG. 7 but two or more grooves may be formed in order to uniformize the thickness of the adhesive 21 even more reliably. When the adhesive 21 is applied to the surface of the rim 10 and the assembly of magnetic disks 1 is thereafter pressed onto it for bonding, the excess portion enters this groove 30 so that a uniform adhesive film can be formed.

Figure 8:
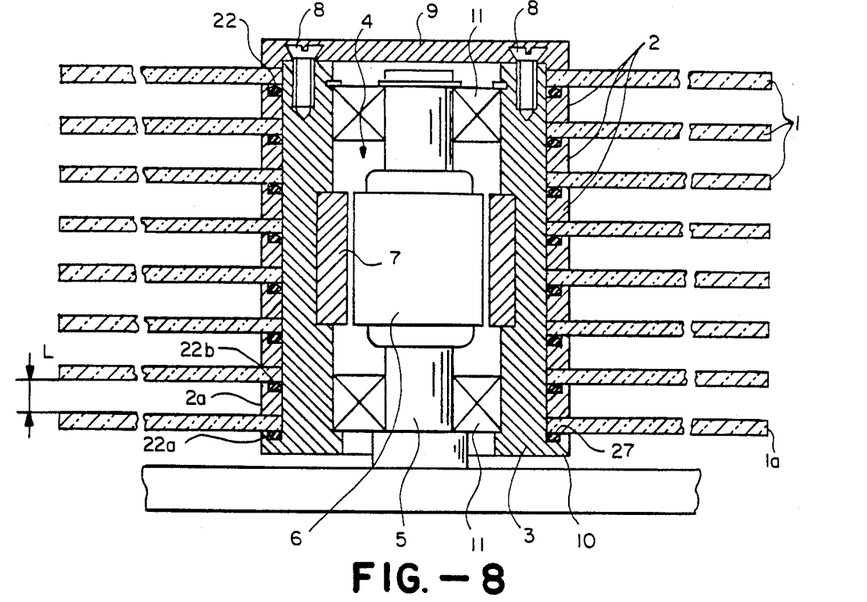
FIG. 8 is a sectional view of a center part of still another magnetic disk drive of the Winchester type embodying the present invention.
Figure 9:
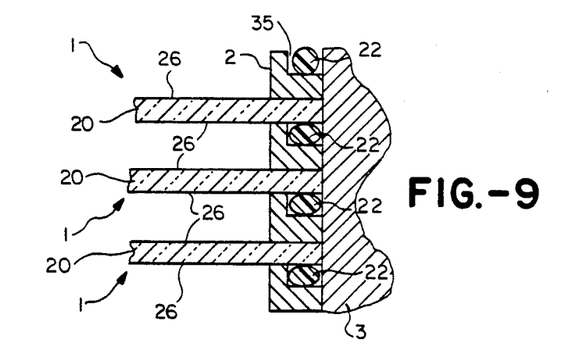
FIG. 9 is an enlarged view of a portion of FIG. 8.
Figure 10:
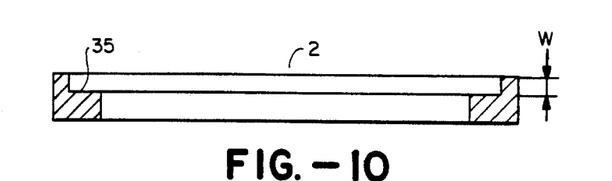
FIG. 10 is a sectional view of a spacer shown in FIGS. 8 and 9.

FIGS. 8 and 9 show another 5.25-inch magnetic disk drive of the Winchester type embodying the present invention. This magnetic disk drive is different from the disk drive described above by way of FIGS. 5 and 6 mainly in that each of the metallic spacers 2 (again with the same measurements as described above) is formed with an indentation 35 of depth W as shown in FIG. 7 and that annular elastic members 22 serving, for example, as O-rings are placed in these indented parts of the spacers 2 as well as in a similarly formed annular indentation 27 on the upper surface of the rim 10 of the spindle 3. These annular elastic members 22 may be made of synthetic rubber such as urethane rubber, acrylic rubber, silicone rubber, or ethylenepropylene rubber. Use may also be made of a mixture or a composite layered material from these substances. It is preferable, as explained above, that use be made of a material which does not undergo any significant plastic deformation within the range of allowable storage temperature from −40° C. to 70° C.

Figure 11:
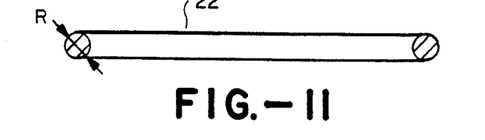
FIG. 11 is a sectional view of an annular elastic member shown in FIGS. 8 and 9.

As shown in FIG. 11, each elastic member 22 has a circular cross sectional shape (and hence is toroidal) with diameter R which is greater than the depth W of the indentations 35 in the spacers 2. Thus, the elastic members 22 are compressed and deformed vertically by the magnetic disks 1 when the magnetic disks 1 and the spacers 2 are assembled together and, expanding horizontally, not only touch the lower surfaces of the magnetic disks 1 but also become compressed against the bottom surfaces of the indentations 35 and the outer peripheral surface of the spindle 3. As a result, the frictional forces on the magnetic disks 1 and the spacers 2 with these elastic members 22 prevent them from slipping with respect to one another not only in the axial direction but also in the direction of their moments of inertia. It is preferable that R be greater than W by about 5% to 30% because it is desirable not only to prevent the magnetic disks 1 from racing but also to prevent plastic deformations of the elastic members 22 by the compressive forces thereupon.

The magnetic disk drive of FIG. 8 may be assembled as follows. To start, the first annular elastic member 22a is passed around the external peripheral surface of the spindle 3 and inserted into the annular indentation 27 on the upper surface of the rim 10. Then, the first magnetic disk 1a is similarly placed around the external peripheral surface of the spindle 3 and set on top of the aforementioned first elastic member 22a. Next, after the first spacer 2a is again moved along the external peripheral surface of the spindle 3 and set on top of the first magnetic disk 1a, the second elastic member 22b is inserted into the annular indentation 35 of the first spacer 2a. Thereafter, magnetic disks, spacers and elastic members are sequentially set one on top of another and at the end, the cap 9 is fastened onto the top surface of the spindle 3 by set screws 8 in order to fasten the entire assembly on the rim 10.

With a magnetic disk drive thus structured, too, magnetic disks can be prevented from breaking easily by the operations of the elastic members 22 because these elastic members 22 are elastically deformed when the cap 9 is fastened, pressing intimately the side and bottom surfaces of the indentations 35 and 27 and the external peripheral surface of the spindle 3 so that the magnetic disks 1 are uniformly compressed. These elastic members 22 serve also to prevent extraordinary forces to act on the magnetic disks 1 caused by the difference in the coefficient of thermal expansion among the materials for the magnetic disks 1, the spacers 2 and the spindle 3 when temperature goes up. As a result, the magnetic disks 1 are not deformed, and do not break. Moreover, as explained above, the magnetic disks 1 and the spacers 2 are both prevented by the friction against the elastic members 22 from slipping not only in the direction of the axis but also in the direction of their moments of inertia.

Figure 12:
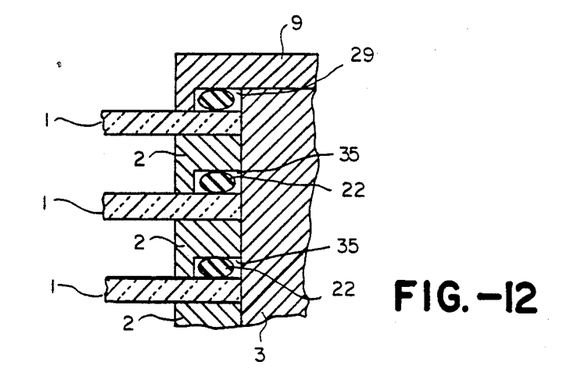
FIG. 12 is an enlarged sectional view of a portion of still another magnetic disk drive embodying the present invention.

FIG. 12 shows a variation of the embodiment of the present invention described above by way of FIGS. 8–11. This variation is characterized as having annular indentations 35 formed on the lower surfaces of the metallic spacers 2 instead of on their upper surfaces. Elastic members 22 are similarly inserted into these annular indentations 35 and a similar annular indentation 29 is also provided near the periphery of the lower surface of the cap 9. No such annular indentation (as indicated by the numeral 27 in FIG. 8) is provided on the upper surface of the rim 10 of the spindle 3. In summary, this variation described above by way of FIG. 12 is obtained from the earlier-described embodiment shown in FIG. 8 merely by putting the spacers 2 upside down. It is clear, therefore, that a magnetic disk drive according to this embodiment is similarly effective.

Figure 13:
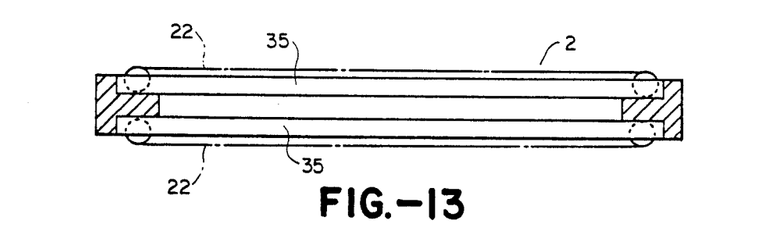
FIG. 13 is a sectional view of another spacer embodying the present invention.

FIG. 13 shows still another variation of the present invention. This spacer 2 is characterized as having annular indentations 35 both on its upper surface and on the lower surface so that two annular elastic members 22 can be inserted into these indentations. Spacers 2 thus structured are advantageous because the frictional force by these elastic members 22 on the spindle 3 and the spacers 2 is doubled so that the magnetic disks 1 and the spacers 2 can be more reliably secured and displacements between them can be prevented more dependably.

Figure 14:
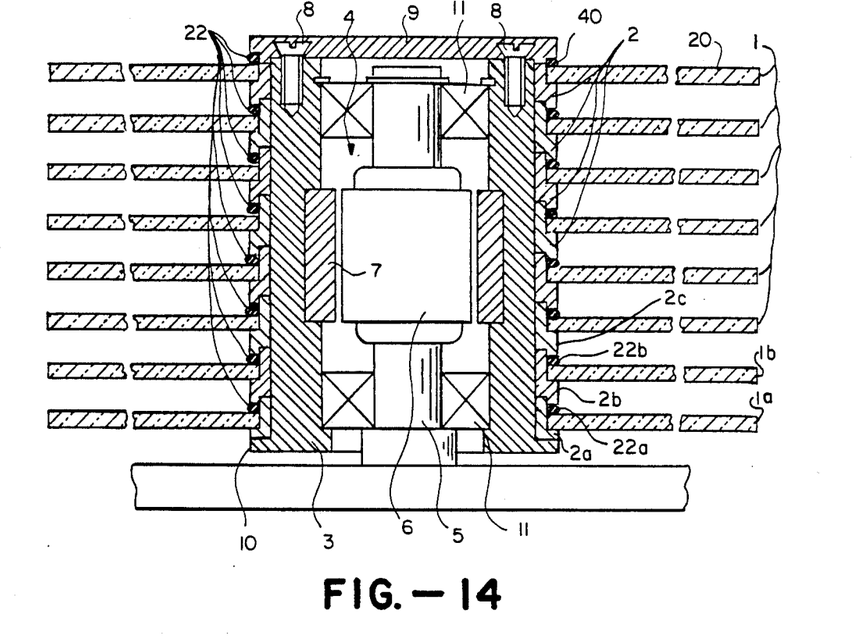
FIG. 14 is a sectional view of a center part of still another magnetic disk drive of the Winchester type embodying the present invention.
Figure 15:
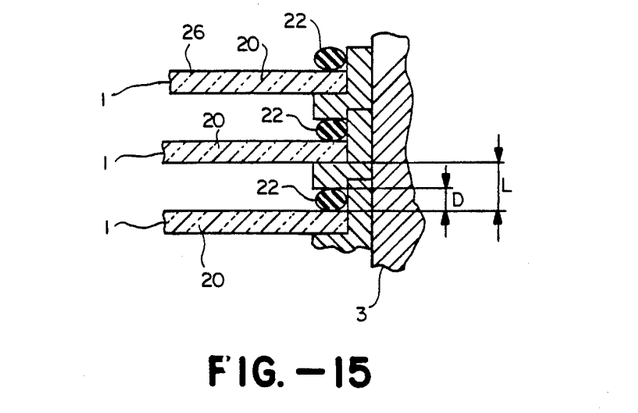
FIG. 15 is an enlarged view of a portion of FIG. 14.
Figure 16:
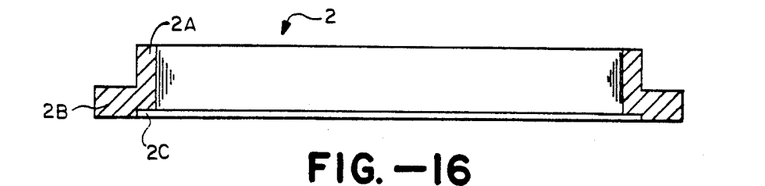
FIG. 16 is a sectional view of a spacer shown in FIG. 15.

FIGS. 14 and 15 show still another 5.25-inch magnetic disk drive of the Winchester type embodying the present invention similar to the one described above by way of FIGS. 8–13 but different therefrom and characterized in that the shape of its spacers 2 is further modified to have an approximately L-shaped cross-section as shown in FIG. 16, comprising a cylindrical part 2A which fits around the external peripheral surface of the spindle 3, a disk-supporting part 2B which protrudes radially outward like the brim of a hat from the entire lower external periphery of this cylindrical part 2A and an engaging part 2C formed on the lower surface so that the top end of the cylindrical part 2A of another spacer 2 immediately below can be engaged from below thereinto so that a series of such spacers 2 can be stacked engagingly one on top of another in an mutually coaxial relationship as shown in FIGS. 14 and 15. The external diameter of the cylindrical part 2A is approximately the same as the internal diameter of the magnetic disk 1 and its internal diameter is approximately the same as the external diameter of the spindle 3. A magnetic disk 1 is disposed on the upper surface of the disk-supporting part 2B and one of the aforementioned annular elastic members 22 is inserted between the lower surface of the disk-supporting part 2B and the upper surface of the magnetic disk 1 therebelow. The interval D (=2.8 mm, for example) between the lower surface of the disk-supporting part 2B and the upper surface of the magnetic disk 1 therebelow is less than the natural (or undeformed) diameter R of the annular elastic member 22 (see FIG. 11) so that these annular elastic members 22 become compressed vertically and deformed when the magnetic disks 1 and the spacers 2 are assembled as shown in FIG. 15, thereby securing the magnetic disks 1 on the respective disk-supporting parts 2B and contacting firmly on the surface of the magnetic disk 1 therebelow. It is prefereable that the ratio R/D be between 1.05 and 1.3 so that the magnetic disks 1 can be prevented from racing and plastic deformations of the annular elastic members 22 can also be prevented.

Figure 17:
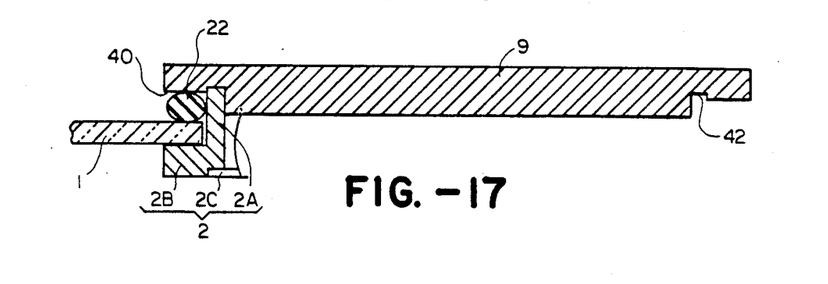
FIG. 17 is a sectional view of another cap embodying the present invention.

The cap 9 has an annular groove 40 formed on the lower surface along its periphery and one of the annular elastic members 22 is inserted in this groove 40 to compress and to thereby secure the top one of the magnetic disks 1. The cap 9 may be designed alternatively as shown in FIG. 17, for example, not only with the annular groove 40 described above but also with another groove 42 for engagingly inserting the top end of the cylindrical part 2A of the spacer 2 at the top.

For assembling the magnetic disk drive of FIG. 14, the first spacer 2a is slipped around the external peripheral surface of the spindle 3 and set on the rim 10 and then the first magnetic disk 1a is set engagingly around the cylindrical part 2A of the first spacer 2a and placed on its disk-supporting part 2. Next, after the first elastic member 22a is set engagingly around the cylindrical part 2A of the first spacer 2a and placed on the first magnetic disk 1a, the second spacer 2b is placed on the first spacer 2a. After spacers, magnetic disks and annular elastic members are sequentially stacked one on top of another in a similar manner, the cap 9 is secured on the upper surface of the spindle 3 with set screws 8 to fasten the entire assembly of the magnetic disks 1 on the rim 10. With a magnetic disk drive thus structured, magnetic disks can be prevented from breaking easily as explained above in connection with the embodiment of the present inventioned described by way of FIGS. 8 and 9.

The foregoing description of embodiments of the present invention has been presented for purposes of illustration and description. It is not intended to be exhaustive or to limit the invention to the precise forms disclosed. For example, the spacers 2 described above as being "metallic spacers" need not necessarily be metallic such as aluminum, an aluminum alloy, iron or titanium although they were invariably illustrated in the figures as being metallic. They may be of non-metallic materials such as glass, ceramics, acrylic, epoxy, bakelite or teflon although no figure illustrating them as being of such non-metallic materials are presented for the sake of convenience. It is preferable, however, that use be made of a material with coefficient of thermal expansion close to that of the spindle 3. Regarding the substrates of the magnetic disks 1, alumina silicate glass, quartz glass and other types of glass may be substituted. Moreover, although the present invention has been described above by way of magnetic disk drives of the Winchester type, this is not intended to be limitative.

With reference to the embodiment of the present invention described above by way of FIGS. 5 and 6, the assembly process may be carried out by preliminarily coating the disks 1 or the elastic spacers 15 with the adhesive 21. Experiments have shown that the elastic spacers 15 need not be inserted between each mutually contacting surfaces of a magnetic disk and a metallic spacer. Even with only two of such elastic spacers 15 between the top magnetic disk and the cap 9 and between the bottom magnetic disk and the rim 10, it was ascertained that the magnetic disks could be protectd sufficiently dependably. Thus, such a disk drive having elastic spacers 15 oly at the top and the bottom of the disk assembly is included within the scope of the invention although not separately illustrated. Alternatively, the elastic spacers 15 may be inserted only on one side (upper or lower) of the metallic spacers 3 although neither is this alternative design illustrated specifically. With reference to the embodiment described by way of FIGS. 9 and 12, the annular indentations 35 are shown as being L-shaped cross-sectionally and formed along the internal peripheries of the spacers 2, but such indentations may be formed near the center of the upper and/or lower surfaces of the spacers 2 with U-shaped cross sections. Experiments have further shown that, if the assembly of magnetic disks according to the present invention is compressed between the cap 9 and the rim 10 with a pressure within the range of 1 kg/mm$^2$ and 3 kg/mm$^2$, the individual magnetic disks do not slip with respect to one another after repeating start-and-stop operations more than $10^4$ times by using a spindle which rotates at the rate of 3600 rpm. The magnetic disks in the disk drives of the present invention did not break in heat cycle tests in the range of $-40°$ C. to 70° C. and their mutual separations (L=5 mm) were dependably maintained.

In summary, the present invention teaches a new, extremely useful technology which allows the use of magnetic disks with base plates made of non-metallic brittle materials such as glass and ceramics and hence magnetic disk drives capable of high-density recording can be made available. Many modifications and variations are possible in light of the above teaching and may be apparent to a person skilled in the art. Some of such modifications and variations have been described but not illustrated specifically because they are relatively similar to one or more of the illustrated embodiments and additional drawings are not likely to substantially make it easier for the reader to understand them. In short, the disclosure is intended to be construed broadly.

What is claimed is:

1. A magnetic disk drive comprising
rotatably around a fixed axis, a spindle disposed rotatably around a fixed axis, said spindle having an external peripheral surface and a rim formed at a lower position on said peripheral surface,
a plurality of magnetic disks disposed engagingly around said spindle and in layers on said rim, and
a plurality of spacers disposed between said magnetic disks and keeping said magnetic disks mutually at a fixed distance,
said magnetic disk drive being characterized wherein
said magnetic disks each comprise a substrate made of a brittle non-metallic material and
said substrates and said spacers are attached together by an adhesive and form a unistructural assembly.

2. The magnetic disk drive of claim 1 wherein said non-metallic material is selected from the group consisting of glass and ceramics.

3. The magnetic disk drive of claim 1 wherein said spacers are formed with grooves on surfaces thereof across which said magnetic disks are in contact therewith.

4. The magnetic disk drive of claim 1 further comprising
  fastening means attachable to said spindle for controllably compressing said assembly against said rim,
  an elastic spacer disposed between said assembly and said fastening means, and
  another elastic spacer disposed beteen said assembly and said rim.

5. The magnetic disk drive of claim 4 wherein said fastening means is attached to said spindle by set screws.

6. The magnetic disk drive of claim 4 wherein said elastic spacers are made of one or more materials selected from the group consisting of synthetic resins and synthetic rubbers not undergoing significant plastic deformation at temperatures between −40° C. and 70° C.

7. A magnetic disk drive comprising
  a spindle disposed rotatably around a fixed axis, said spindle having an external peripheral surface and a rim formed at a lower position on said peripheral surface,
  a plurality of magnetic disks disposed engagingly around said spindle and in layers on said rim, and
  a plurality of spacers disposed between said magnetic disks to keep said magnetic disks mutually at a fixed distance to form an assembly, and
  fastening means attachable to said spindle for controllably compressing said assembly against said rim,
  said magnetic disk drive being characterized wherein
  said magnetic disks each comprise a substrate made of a brittle non-metallic material,
  said spacers are each formed with an annular indentation on at least one of the surfaces thereof in contact with one of said magnetic disks, and
  said magnetic disk drive further comprises annular elastic members each disposed in one of said indentations.

8. The magnetic disk drive of claim 7 wherein said non-metallic material is selected from the group consisting of glass and ceramics.

9. The magnetic disk drive of claim 7 wherein said annular elastic members are naturally toroidal with a circular cross-section of diameter R which is between 1.05 and 1.3 times the depth of said indentations in said spacers.

10. The magnetic disk drive of claim 7 wherein said annular elastic members are pressed against said external peripheral surface of said spindle.

11. The magnetic disk drive of claim 7 wherein said magnetic disks are maintained at same intervals.

12. The magnetic disk drive of claim 7 wherein said annular elastic members are made of one or more synthetic rubber materials not undergoing significant plastic deformation at temperatures between −40° C. and 70° C.

13. A magnetic disk drive comprising
  a spindle disposed rotatably around a fixed axis, said spindle having an external peripheral surface and a rim formed at a lower position on said peripheral surface,
  a plurality of magnetic disks disposed engagingly around said spindle and in layers on said rim, and
  a plurality of spacers disposed between said magnetic disks to keep said magnetic disks mutually at a fixed distance to form an assembly, and
  fastening means attachable to said spindle for controllably compressing said assembly against said rim,
  said magnetic disk drive being characterized wherein
  said magnetic disks each comprise a substrate made of a brittle non-metallic material, and
  said spacers each comprise
  a cylindrical part which engages with said external peripheral surface of said spindle,
  a disk-supporting part which protrudes outward from a lower edge section on the external peripheral surface of said cylindrical part and serves to carry one of said magnetic disks thereon, and
  an engaging part formed on the lower surface of said cylindrical part and serves to accept the cylindrical part of the adjacent one of said spacers therebelow,
  an annular elastic member being disposed between the lower surface of said disk-supporting part and said adjacent one of said spacers therebelow.

14. The magnetic disk drive of claim 13 wherein aid annular elastic member are naturally toroidal with a circular cross section of diameter R which is between 1.05 and 1.3 times the separation between the lower surface of said disk-supporting part and the upper surface of one of said magnetic disks on said adjacent one of said spacers therebelow.

15. The magnetic disk drive of claim 13 wherein said non-metallic material is selected from the group consisting of glass and ceramics.

16. The magnetic disk drive of claim 13 wherein said annular elastic member is made of one or more of synthetic rubber materials including urethane, rubber, acrylic rubber, silicone rubber and ethelyenepropylene rubber which do not undergo significant plastic deformation at temperatures between −40° C. and 70° C.

17. A magnetic disk drive comprising
  a spindle disposed rotatably around a fixed axis, adapted to be rotated by a motor and having an external peripheral surface and a rim which protrudes from said external peripheral surface at a low position,
  a plurality of magnetic disks disposed engagingly around said external peripheral surface of said spindle and set on said rim,
  a plurality of spacers inserted between said magnetic disks to maintain said magnetic disks mutually at a fixed distance, and
  a fastening means secured to an upper end surface of said spindle to compress parts of said magnetic disks opposite said rim,
  said magnetic disk drive being characterized wherein
  said magnetic disks each comprise a substrate made of a brittle non-metallic material, and
  elastic members are disposed between said fastening means and the adjacent one of said magnetic disks to said fastening means and between said rim and the adjacent one of said magnetic disks to said rim.

18. The magnetic disk drive of claim 17 wherein said elastic members are made of synthetic resin.

19. The magnetic disk drive of claim 17 wherein said elastic members are made of synthetic rubber.

20. The magnetic disk drive of claim 17 wherein said elastic members are further inserted between said spacers and said magnetic disks.

21. The magnetic disk drive of claim 17 wherein said magnetic disks are compressed between said fastening means and said rim with a pressure in the range of 1 kg/mm and 3 kg/mm.

22. The magentic disk drive of claim 17 wherein said non-metallic material is selected from the group consisting of glass and ceramics.

23. A magnetic disk drive comprising
   a spindle disposed rotatably around a fixed axis, adapted to be rotated by a motor and having an external peripheral surface and a rim which protrudes from said external peripheral surface at a low position,
   a plurality of magnetic disks disposed engagingly around said external peripheral surface of said spindle and set on said rim,
   a plurality of spacers inserted between said magnetic disks to maintain said magnetic disks mutually at a fixed distance, and
   a fastening means secured to an upper end surface of said spindle to compress parts of said magnetic disks opposite said rim,
   said magnetic disk drive being characterized wherein
   said magnetic disks each comprise a base plate made of a brittle non-metallic material, and
   the difference in coefficient of thermal expansion between the materials of said spacer and said spindle is less than $50 \times 10^{-7}/\deg$.

24. The magnetic disk drive of claim 23 wherein said non-metallic material is selected from the group consisting of glass and ceramics.

25. The magnetic disk drive of claim 23 wherein elastic members are inserted between said fastening means and the adjacent one of said magnetic disks to said fastening means and between said rim and the adjacent one of said magnetic disks to said rim.

26. The magnetic disk drive of claim 23 wherein elastic members are inserted between said spacers and said magnetic disks.

27. A magnetic disk drive comprising
   a spindle disposed rotatably around a fixed axis, adapted to be rotated by a motor and having an external peripheral surface and a rim which protrudes from said external peripheral surface at a low position,
   a plurality of magnetic disks disposed engagingly around said external peripheral surface of said spindle and set on said rim,
   a plurality of spacers inserted between said magnetic disks to maintain said magnetic disks mutually at a fixed distance, and
   a fastening means secured to an upper end surface of said spindle to compress parts of said magnetic disks opposite said rim,
   said magnetic disk drive being characterized wherein
   said magnetic disks each comprise a substrate made of a brittle non-metallic material, and
   the difference in coefficient of thermal expansion between said non-metallic material and the material of said fastening means is less than $50 \times 10^{-7}/\deg$.

28. The magnetic disk drive of claim 27 wherein said non-metallic material is selected from the group consisting of glass and ceramics.

29. The magnetic disk drive of claim 27 wherein elastic members are inserted between said fastening means and the adjacent one of said magnetic disks to said fastening means and between said rim and the adjacent one of said magnetic disks to said rim.

30. The magnetic disk drive of claim 27 wherein elastic members are inserted between said spacers and said magnetic disks.

* * * * *

UNITED STATES PATENT AND TRADEMARK OFFICE
CERTIFICATE OF CORRECTION

PATENT NO. : 4,945,432
DATED : July 31, 1990
INVENTOR(S) : Takeo Matsudaira, et al.

It is certified that error appears in the above-identified patent and that said Letters Patent is hereby corrected as shown below:

Column 10, line 48 (Claim 1) delete "rotatably around a fixed axis".

Column 12, line 18 (Claim 14), change "aid" to --said--.

Column 12, line 19 (Claim 14), change "are" to --is--.

Signed and Sealed this

Thirty-first Day of March, 1992

Attest:

HARRY F. MANBECK. JR.

*Attesting Officer*     *Commissioner of Patents and Trademarks*